United States Patent
Maroon

(12) 
(10) Patent No.: US 6,239,961 B1
(45) Date of Patent: May 29, 2001

(54) OVERVOLTAGE PROTECTION CIRCUIT

(75) Inventor: Raymond Maroon, Solana Beach, CA (US)

(73) Assignee: Elgar Electronics Corporation, San Diego, CA (US)

(*) Notice: Subject to any disclaimer, the term of this patent is extended or adjusted under 35 U.S.C. 154(b) by 0 days.

(21) Appl. No.: 09/349,540

(22) Filed: Jul. 8, 1999

(51) Int. Cl.⁷ .................................................. H02H 3/18
(52) U.S. Cl. ................................. 361/86; 361/91.1
(58) Field of Search ............................ 361/86, 91.1, 79, 361/91.3, 18

(56) References Cited

U.S. PATENT DOCUMENTS 4,428,020 * 1/1984 Blanchard, Jr. ..................... 361/90
5,424,894 * 6/1995 Briscall et al. ..................... 361/45

* cited by examiner

Primary Examiner—Michael J. Sherry
(74) Attorney, Agent, or Firm—Luce, Forward, Hamilton & Scripps LLP

(57) ABSTRACT

An overvoltage detection circuit protects a load that is connected to a power system through distribution cables. The circuit makes a first measurement of the total voltage drop in the cables by subtracting the differential voltage at the load from the differential voltage at the power system. The circuit also makes a second measurement of the voltage drop in the cables based upon the current passing through the cables. If the first measurement exceeds the second measurement, either outright or by a predetermined amount, then a fault signal is produced in order to shut down the power system. A timer can be used to filter out acceptable transients.

8 Claims, 2 Drawing Sheets

OVERVOLTAGE PROTECTION CIRCUIT

FIELD OF THE INVENTION

The present invention is directed to a method and apparatus for sensing a condition where voltage-sense leads of a voltage regulating power system are not properly connected to load terminals in an electric circuit, and in particular to a circuit for preventing a subsequent overvoltage condition on a voltage-regulated load.

BACKGROUND OF THE INVENTION

When electric current flows through a circuit, it encounters inherent electrical resistance or impedance as it passes through respective elements in the circuit. As established by Ohm's Law, the result of current moving through a circuit element is a voltage drop across that element. Often a circuit element can withstand only a maximum voltage drop, and may be damagedby an excessive or overvoltage condition.

Power systems that supply current or voltage to a circuit can be provided with overvoltage detectors. Such detectors can be used to sense voltage drops across circuit elements, or loads, that are at risk of encountering overvoltage conditions, but most look at voltage across terminals that are being voltage-regulated or current-regulated by the supply. Some power systems can regulate the voltage across load terminals, instead of power supply terminals, as away to achieve a more precise load voltage regulation. In order for load voltage regulation to be effective in these systems, voltage sense leads must be correctly connected to the appropriate load terminals before the load is energized. The overvoltage detector can then monitor voltage across the load terminals, preferably through the same sense leads, and if an overvoltage condition is sensed, i.e., a voltage that is greater than the threshold value, then the power system is shut off in order to prevent damaging the load. Unfortunately, if the load voltage sensors are not connected properly, for example if they are shorted together, an overvoltage condition can occur without the power system sensing it, resulting in damage to the load. Without supplemental protection, improperly connected sense leads will likely result in the load's voltage exceeding its regulation limits, and perhaps exceeding a maximum safe limit if that is within the compliance range of the power system, when it is energized. This is due to the normal behavior of gain limited negative feedback regulation employed by state of the art power systems that would act to produce greater supply terminal voltage in an attempt to increase the voltage across its shorted sense connections.

Some prior art systems with load voltage sensing capability provide supplemental overvoltage detection at the supply terminals in addition to basic detection at the load terminals. These schemes require a second voltage threshold that allows for load voltage, voltage drop along the distribution cables, component value tolerances, circuit noise and offset voltages. In some systems, the supplemental overvoltage threshold is programmable by an operator for greater precision, and in others may be fixed in hardware as determined by the system designer, providing a less precise supplemental protection.

Known prior art supplemental overvoltage protection schemes where thresholds are fixed in hardware can be incapable of providing load overvoltage protection when the load overvoltage limit is below the supplemental threshold. This condition can exist for circuits where the maximum expected cable voltage drop is significant relative to that of the load. Setting a threshold with hardware that allows both for maximum cable voltage drop and load voltage drop will also allow a supply terminal voltage to be present that could damage the load when a lesser actual cable voltage drop is present. One extreme case would exist for an unlikely condition of zero actual cable impedance. More realistic cable impedance would most likely fall between some minimum value and a maximum specified value. In this modality for ineffecfive supplemental protection in prior schemes, low cable impedance interferes with the supplemental circuit's effectiveness in protecting the load, and subsequently protection does not work if the load overvoltage limit is below the supplemental threshold less the actual total cable voltage drop. The length of the cable, size of the cable's conductor cross-section, type of conductor, temperature of the conductor, cable construction, and cable routing all contribute to determining the actual impedance of distribution cables intended for most system installations. Other modalities for failure of known prior art non-programmable protection schemes may also exist that are not described here.

For some loads, greater absolute precision may be required in enforcing a supplemental overvoltage threshold, directing design of those prior art supplemental schemes preferably toward requiring programming of the supplemental threshold value rather than having it fixed in hardware. Human programming error, if it occurs, would likely render the more precise supplemental overvoltage detection system ineffective.

Causes for failure of overvoltage load protection therefore can include human programming error, human connection error or hardware failure involving sense lead connections, and inability of known protection schemes to protect low voltage loads with possibly significant expected cable voltage drops between zero and the maximum safe load voltage.

BRIEF SUMMARY OF THE INVENTION

The inventor has found that a need exists for a detector to supplement prior art load overvoltage detection in circuits with load voltage regulating power systems, that yields fault indications in the event of a misconnection, or failed connection of the load voltage sense leads to the load terminals.

It is an object of the present invention to provide protection against an overvoltage condition across a load due to voltage supplied by a state-of-the-art load voltage or current regulating power system, for load sense lead fault conditions.

Another object of the present invention is to provide a fault detector that enables reliable protection against load overvoltage.

It is yet a further object of the present invention to provide an inventive method for sensing and responding to conditions that could produce load overvoltage.

These and other objects are achieved by providing a protection circuit that protects a load against overvoltage, the load being connected to a power source through cables, said circuit comprising a first voltage measurement circuit for measuring a total cable voltage drop across the cables; a second voltage measurement circuit for measuring current passing through the cables and for producing a measurement of voltage-limit for the cables based upon the measured current; and a controller for issuing a fault signal if the cable voltage drop measurement exceeds the total cable voltage-limit measurement by a predetermined amount.

These and other objects are also achieved by providing a protection circuit to provide protection of a load against overvoltage that results from sense lead faults, the load being connected to terminals of a power source through cables, said method comprising measuring a total voltage drop across the cables; measuring current passing through the cables; converting the measured current to a total cable voltage-limit measurement based upon maximum resistance of the cables; determining whether the cable voltage exceeds the total cable voltage limit by a predetermined amount, and if so, issuing a fault signal representing an overvoltage condition.

The subject invention may be implemented by measuring the voltage across power distribution cables in two different ways, and comparing the results. If one of the measurements is out of line with the other measurement, then the assumption can be made that a voltage sense lead is misconnected, justifying a shut off of the power source.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings.

DETAILED DESCRIPTION OF THE PREFERRED EMBODIMENTS

The following description of the preferred embodiments refers to an overvoltage sensing circuit and method which are useful for sensing actual or potential overvoltage conditions across a low-voltage circuit element, or load. It should be understood, however, that the load can be any type or combination of circuit elements, from high-voltage circuit elements to theoretically impedance-free elements, and may include the traces on a printed circuit board leading to the load.

Figure 1:
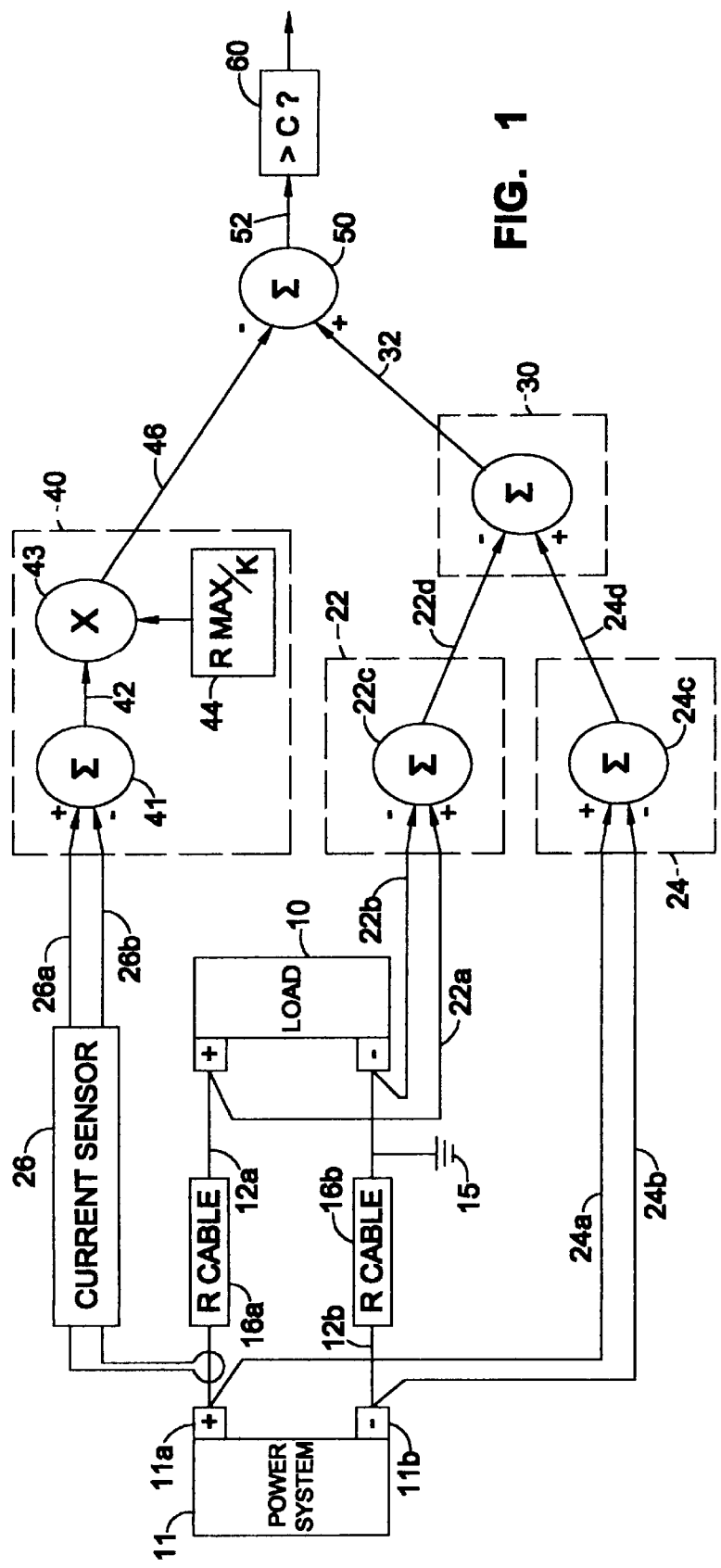
FIG. 1 shows a schematic circuit diagram of an overvoltage sensing circuit according to a preferred embodiment of the present invention.

In FIG. 1, a simplified electric circuit includes a load 10 connected to a power system or supply 11 by electrically conductive distribution cables 12a, 12b. The first cable 12a is shown connecting the power system's positive output terminal 11a to a positive-side input of the load 10, and the second cable 12b connects the negative-side input of the load 10 to the power system's negative output terminal 11b. The second cable 12b may be grounded, as at 15. The load 10 is preferably a low voltage, high current load requiring precision voltage regulation from the power system 11. The cables 12a, 12b have inherent resistances or impedances 16a, 16b which can be significant relative to the resistance of the load 10, and can be measured using laboratory instruments with AC and/or DC power sources. The circuit can be one in which the cost, size, or other constraints disallow increasing the current handling capability of the distribution cable in order to reduce its impedance and subsequently its voltage drop. It can also be one in which the allowable power duty cycle is low in order to limit average power dissipation. Regardless, the preferred embodiment is one in which the voltage drop anticipated to occur across the distribution cables 12a, 12b is not a negligible fraction of the power system's output terminal voltage.

The embodiment of the present invention shown in FIG. 1 includes a remote load voltage sensor 22 for monitoring the voltage across the positive and negative inputs of the load 10. The sensor 22 is connected by a positive lead 22a and a negative lead 22b to respective sides of the load 10. The voltages on leads 22a, 22b are combined, for example in an adder 22c, to produce a voltage difference signal 22d for the load voltage.

A power system output voltage sensor 24 monitors the output voltage across the positive and negative output terminals 11a, 11b of the power system 10. The sensor 24 is connected by a positive lead 24a and a negative lead 24b to respective ones of the power system's output terminals 11a, 11b. The voltages on leads 24a, 24b are combined, for example in an adder 24c, to produce a voltage difference signal 24d for the power system's output voltage. It should be understood that, in more complex circuits, the power system might not be the actual power source, but rather the terminals where the cables receive their power.

A first voltage measurement circuit 30 subtracts the load voltage 22d from the power system output voltage 24d to produce a first difference signal 32. Circuit 30 is preferably an adder. The first difference signal 32 is a measurement of the total voltage drop across the distribution cables 12a, 12b. The artisan will appreciate that the circuits 22, 24, 30 can be integrated into a single measurement circuit. Their purpose is to produce a cable voltage measurement based on voltage measurements in the circuit.

A cable current sensor 26 monitors the current passing through the first distribution cable 12a. In the illustrated embodiment, the current flowing through the loop circuit is the same no matter where it is measured, and therefore the current sensor 26 can be placed anywhere in the circuit. For more complex circuits, the artisan will recognize that there maybe fewer options where the current sensor 26 can be placed in order to measure the current flowing through the cable leading to/from the load 10. Current sensors are known in the art, and therefore need not be further described herein. Sensor 26 preferably produces a voltage signal across positive and negative output leads 26a, 26b proportional to the amount of detected current, based on an arbitrary or predetermined amplification factor, K.

A second voltage measurement circuit 40 converts the voltages from leads 26a, 26b into a threshold measurement 46 of the cable voltage, also called a Safe Operating Area (SOA) cable voltage. Circuit 40 preferably includes an adder 41 which subtracts voltage 26b from voltage 26a and produces a voltage difference signal 42 which is then multiplied, in multiplier 43 by a predetermined constant 44 which, in a preferred embodiment, is ($R_{max}$/K). Here, $R_{max}$ is the maximum expected resistance or impedance of the distribution cables, i.e., $R_{max}$ equals resistance 16a of the first cable 12a plus resistance 16b of the second cable 12b. Because the described embodiment of current sensor 26 includes an amplification factor K, the constant 44 mathematically removes the factor K by scaling $R_{max}$ by (1/K). The artisan will appreciate that the current sensor 26 can be part of the second voltage measurement circuit 40, and that the purpose of the sensor 26 and circuit 40 is to produce a cable voltage measurement based on the current passing through.

A comparison circuit 50 compares SOA cable voltage 46 to the first difference signal 32. Comparison circuit 50 may be an adder. If the first difference signal 32, which represents a calculation of the cable voltage based on the respective voltages across power system 11 and load 10, is greater than the cable voltage as measured by the current sensor 26, then the system determines that the leads 22a, 22b of remote load voltage sensor 22 are connected improperly, e.g., the leads may be connected to the wrong sides of load (the polarities are reversed), or they are shorted together, or perhaps one or both of them is not connected at all to the load 10.

Control circuitry can use the output 52 of comparison circuit 50 as a fault signal to shut off the power system 11. In FIG. 1, control circuitry is shown as a simple "greater than zero" detector 60, but it can be a microprocessor-based controller or any other type of controller suitable for deciding whether to react to the output signal 52. Detector 60 may simply detect whether measurement 32 is greater than measurement 46, or it can detect whether measurement 32 exceeds 46 by a predetermined amount.

In an embodiment of the present invention, anomalous transients in either the SOA signal 46 or the first difference signal 32 may be caused by noise or by parasitic inductance in either or both of the distribution cables 12a, 12b, or elsewhere. In order to prevent unwarranted shut down of the power system 11 when tolerable transients arrive at the comparison circuit 50, a timer 70 (FIG. 2) can be used. Timer 70 is connected to the output of detector 60 and determines whether the transient lasts for more than a predetermined amount of time, such as one or a few milliseconds. If it does, then timer 70 generates a fault signal 72. Together with an AND gate or other detector 80, tolerable transients are properly filtered out from the fault signal ultimately produced by the present invention. Instead of timer 60, another option is to use a di/dt scaling component in calculating the SOA voltage measurement 46, but the timer is more simple.

If the present invention uses a delay, such as timer 70, before issuing a fault signal, it is important for the power system 11 to have an acceptably slow slew rate. The fault signal may be delayed by timer 70 for a predetermined time interval, so power system 11 should have performance characteristics that do not allow it to increase its voltage within that predetermined time interval to a level that exceeds the load's permissible voltage limit. If power supply 11 is able to increase its output levels very quickly, then the predetermined time interval waited by timer 70 should be set to an appropriately short length of time. The timer circuit 70, 80 can provide a signal to downstream controller(s) that decide whether to shut down 84 the output of the power system, to set a "shut down" flag 86 if indeed the power system is shut down, and/or to set a shut down latch 88.

Figure 2:
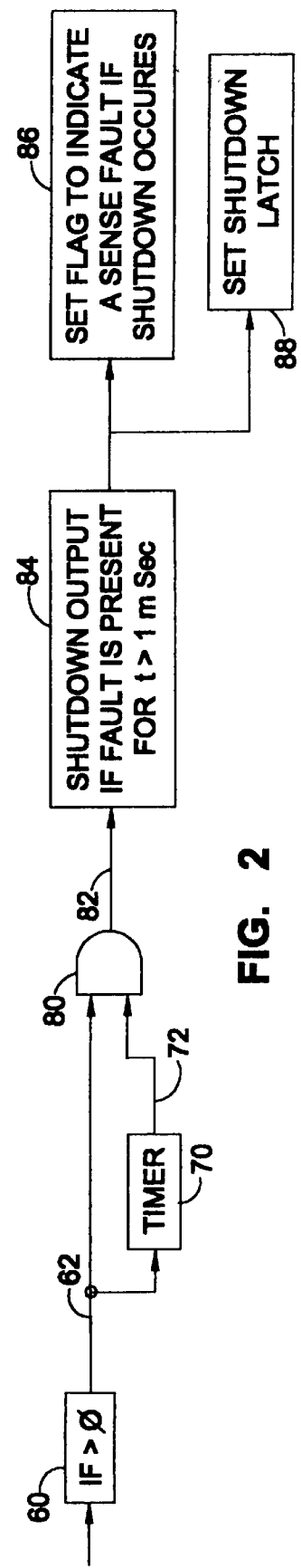
FIG. 2 shows a continuation of FIG. 1 according to another embodiment of the present invention.
Figure 3:
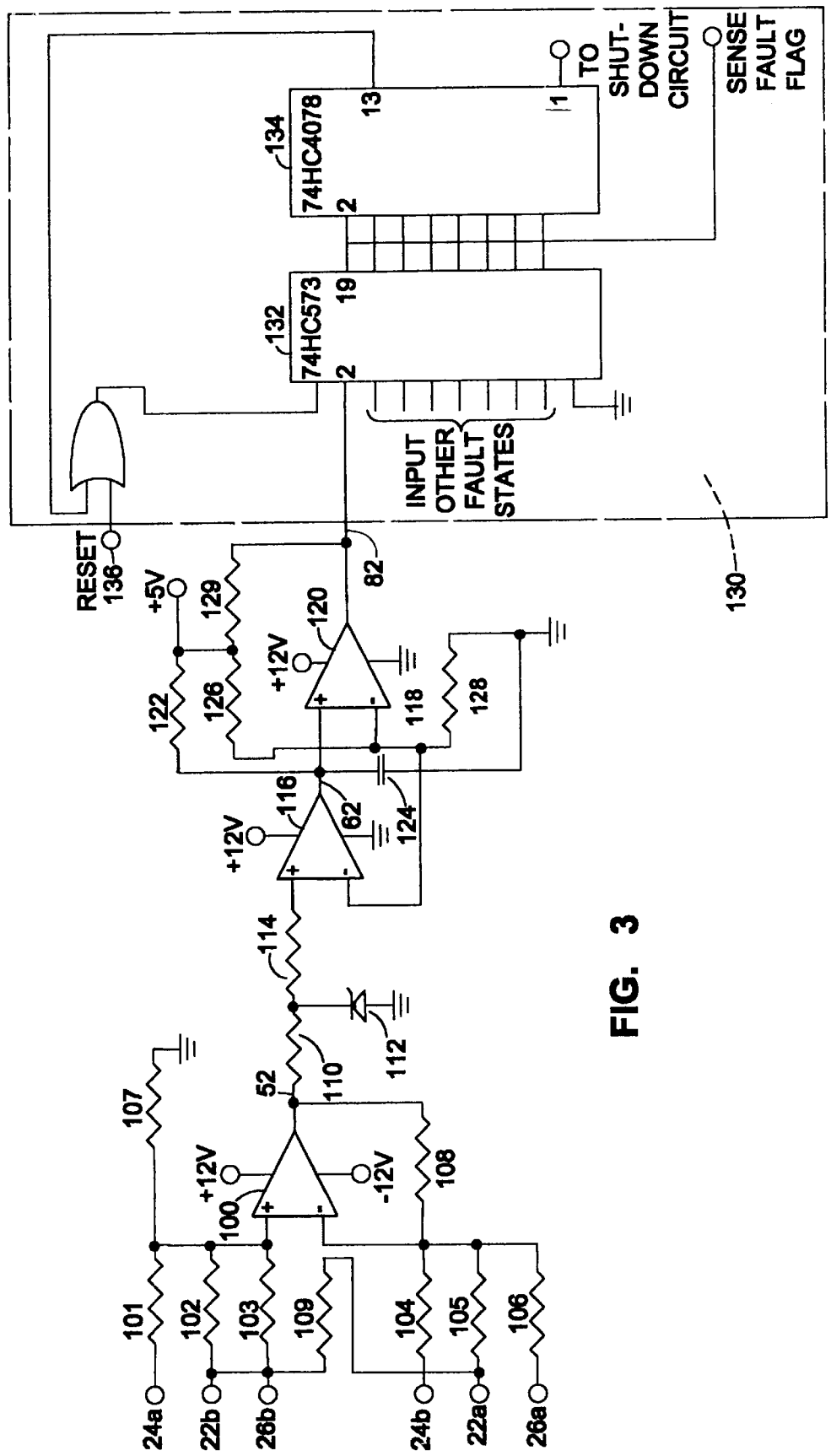
FIG. 3 shows a more detailed circuit for implementing the embodiment of FIG. 2.

FIG. 3 shows a diagram for a circuit that implements the embodiment of the invention shown in FIGS. 1 and 2. It should be understood that the embodiments of FIGS. 1 to 3 are each exemplary embodiments and that numerous other ways of implementing the present invention will become apparent after reviewing this description. In FIG. 3, an operational amplifier 100 in combination with a set of input resistors 101–106, a feedback resistor 108, and a resistor 107, acts as the remote load voltage sensor 22, power system output voltage sensor 24, first voltage measurement circuit 30, and second voltage measurement circuit 40. The output of operational amplifier 100 carries signal 52 of FIG. 1.

Operational amplifier 100 is connected to power, such as positive and negative 12 volt sources. Its positive input terminal is connected through resistor 101 to positive lead 24a (i.e., to the positive output terminal 11a of the power system 11); through resistor 102 to negative lead 22b (i.e., to the negative side of load 10); and through resistor 103 to negative output lead 26b (i.e., to the negative voltage signal of current sensor 26). The negative input terminal of operational amplifier 100 is connected through resistor 104 to negative lead 24b (i.e., to negative output terminal 11b of the power system 11); through resistor 105 to positive lead 22a (i.e., to the positive side of load 10); and through resistor 106 to positive output lead 26a (i.e., to the positive voltage signal of current sensor 26). Resistors 101 and 104 preferably have the same value, as do resistors 102 and 105, a sample resistance value for each being 4.75K ohms. Resistors 103 and 106 may be on the order of 15.4K ohms, although their value will depend on the amplification factor found in the current sensor 26.

The positive terminal of operational amplifier 100 is also preferably connected to ground through resistor 107, and the negative terminal is preferably connected by a feedback resistor 108 to the output of operational amplifier 100. Resistors 107, 108 create voltage dividers together with resistors 101–106, and preferably have the same value, which may be 68.1K ohms.

Greater than zero detector 60 can be implemented by a comparitor 116. On the front end of the comparitor, the positive input terminal is connected to the output of operational amplifier 100 through a pair of resistors 110, 114 which are connected to each other at a node. The node is connected to ground through a schottky diode 112 in order to prevent negative voltages from damaging the comparitor 116. Resistor 110 may be on the order of 4.99K ohms, and resistor 114 may be 10K ohms. The negative input terminal of comparitor 116 is connected to a voltage divider, preferably establishing 2.5V, created by resister 126, resistor 128, +5V, and ground. The output line of comparitor 116 carries the output signal 62 from detector 60.

The timer circuit 70, 80 can be implemented in numerous ways. In FIG. 3, a comparitor 120 has its positive input terminal connected to the output 62 of comparitor 116, and through a resistor 122 to positive power, which may be +5 volts. Resistor 122 may be about 14.3K ohms. The positive input terminal is also connected through a capacitance 124, on the order of 100 nF, to ground. The negative input terminal of comparitor 120 is connected to a voltage divider between the positive power (through a resistance 126, which may be about 4.99K ohms) and ground (through a similar resistance 128). The negative input terminal of comparitor 116 is preferably connected to the negative input terminal of comparitor 120. The output terminal of comparitor 120 may be connected through a pull up resistance 129 to the positive power. Resistor 129 may have a value of about 10K ohms. The fault signal produced by the timer circuit is carried on the output 82 of comparitor 120.

As indicated above, the output of detector 60 can be used as a fault indication signal, or in embodiments that use the timer circuit, the output of the timer can be used as the fault signal. FIG. 3 shows another embodiment, using the output 82 of the timer circuit as a signal input to control circuitry 130. The circuitry 130 can implement the functions of controllers 84,86,88, and can include a 74HC573 chip 132 with pin 2 receiving signal 82 and pin 19 producing the "fault" sense flag. A power supply controller 134 can be a 74HC4078A, receiving the fault sense flag on pin 2 and producing a shutdown signal to the power supply from pin 1. A reset button 136 can also be used as a manual power supply reset. The artisan will recognize that any appropriate controller can be used as controller 130.

As an example of the inventive circuit's operation, the load voltage can have a permissible maximum of 1.65 volts. The SOA voltage 46 should be equal to or greater than the cable voltage 32, so the output of operational amplifier 100 is normally low enough not to trigger a logical high signal from comparitor 116. Because comparitor 116 normally produces a logical low output, comparitor 120 likewise produces a logical low output which represents a no-fault condition. In the event of an incorrectly connected sense lead on the load 10, the output from operational amplifier 100 becomes high enough (in the embodiment of FIG. 3, more than 2.5 volts) to trigger a logical high output from comparitor 116. If the logical high output stays high long enough, for example more than one millisecond, then comparitor 120 produces a logical high output which is interpreted by electronic controller 130 as a fault condition. In essence, the present invention measures the voltage of the distribution cables two ways, rather than measuring the voltage of the power source or load, and bases its fault determination on those measured voltages.

In another embodiment of the present invention, the circuit is enhanced by connecting a resistance, such as a resistor 109 (FIG. 3), between the leads 22a, 22b of the remote load voltage sensor 22. The resistance should be a high resistance relative to the resistance or impedance of load 10 to preferably maintain a high input impedance of the detector. A suitable value can be around 10K ohms. With this resistance in place, a zero voltage difference is detected between the sense leads 22a, 22b in the event that one or both of them are not connected properly to load 10, and therefore the detection circuit operates as if the sense leads were shorted.

The invention can also use a pull-up resistor for one of the sense leads, such as lead 22b, and a pull-down resistor for the other sense lead, such as lead 22a. If improperly connected to the load 10, the leads 22a, 22b would produce a differential signal analogous to a reverse-polarity connection. This causes the first differential voltage measurement 32 to increase beyond the permissible SOA46, and thus forces a fault signal to be produced.

The present invention can be used as a stand-alone overvoltage protection circuit, for instance for the cable, or as a supplement to whatever protection may already exist in a particular circuit. It will find applicability in numerous areas, including power conditioning, power conversion, and power regulation.

The invention having been thus described, it will be obvious that the same may be varied in many ways, not only in construction but also in application. Such variations are not to be regarded as a departure from the spirit and scope of the invention, but rather as modifications intended to be encompassed within the scope of the following claims.

What is claimed is:

1. An overvoltage detection circuit for protecting a load, the load being connected to output terminals of a power source through cables, said circuit comprising:
    a first voltage measurement circuit for measuring a total cable voltage drop across the cables;
    a second voltage measurement circuit for sensing current passing through the cables and for producing a second cable voltage drop measurement for the cables based upon the sensed current; and
    a controller for issuing a fault signal if the total cable voltage drop exceeds the second cable voltage drop measurement by a predetermined amount.

2. The overvoltage detection circuit of claim 1, wherein the predetermined amount is zero.

3. The overvoltage detection circuit of claim 1, wherein said second voltage measurement circuit includes:
    a current detector for sensing the current passing through the cables; and
    a current-to-voltage convertor for converting the sensed current to the second cable voltage drop measurement based on resistance of the cables.

4. The overvoltage detection circuit of claim 3, wherein said first voltage measurement circuit includes:
    a first differential voltage detector for measuring voltage across the output terminals;
    a second differential voltage detector including a pair of sense leads, each sense lead connected at a distal end to the load, wherein said second differential voltage detector measures voltage across the distal ends of the sense leads; and
    a subtracting circuit for subtracting the voltage across the distal ends of the sense leads as measured by said second differential voltage detector from the voltage across the output terminals as measured by said first differential voltage detector, and producing the total cable voltage drop.

5. The overvoltage detection circuit of claim 1, wherein said first voltage measurement circuit includes:
    a first differential voltage detector for measuring voltage across the output terminals;
    a second differential voltage detector including a pair of sense leads, each sense lead connected at a distal end to the load, wherein said second differential voltage detector measures voltage across the load distal ends of the sense leads; and
    a subtracting circuit for subtracting the voltage across the distal ends of the sense leads as measured by said second differential voltage detector from the voltage across the output terminals as measured by said first differential voltage detector, and producing the total cable voltage drop.

6. A method of protecting a load against an overvoltage condition, the load being connected to output terminals of a power source through cables, said method comprising:
    measuring a total voltage drop across the cables;
    measuring current passing through the cables;
    converting the measured current to a cable voltage drop based upon resistance of the cables; and
    determining whether the total voltage drop exceeds the cable voltage drop by a predetermined amount, and if so, issuing a fault signal representing an overvoltage condition.

7. The method of claim 6, wherein said step of measuring the total voltage drop across the cables includes:
    measuring a first differential voltage across the output terminals;
    measuring a second differential voltage across sense leads that are to be connected to the load; and
    subtracting the second differential voltage from the first differential voltage.

8. The method of claim 6, wherein said step of measuring current passing through the cables includes:
    measuring the current passing through the cables; and
    converting the measured current to the cable voltage drop measurement based on resistance of the cables.

* * * * *